United States Patent [19]

Woodruff et al.

[11] 4,414,674
[45] Nov. 8, 1983

[54] ELECTRIC FURNACE THERMAL-INSULATING MODULE

[75] Inventors: Richard K. Woodruff, West Dundee; Joseph P. Tedesco, Oak Lawn, both of Ill.

[73] Assignee: Refractory Products Co., Elgin, Ill.

[21] Appl. No.: 289,811

[22] Filed: Aug. 3, 1981

[51] Int. Cl.³ ............................ F27D 1/00; E04B 1/80
[52] U.S. Cl. ................................. 373/130; 373/137; 52/506; 52/511; 432/247; 110/336
[58] Field of Search ............... 373/130, 137; 52/506, 52/509, 513, 404, 511, 415, 422, 432, 440, 442; 432/247; 110/336

[56] References Cited

U.S. PATENT DOCUMENTS

| | | |
|---|---|---|
| 4,001,996 | 1/1977 | Byrd, Jr. |
| 4,088,825 | 5/1978 | Carr ............................. 373/130 |
| 4,120,641 | 10/1978 | Myles |
| 4,122,644 | 10/1978 | Woodruff |
| 4,249,888 | 2/1981 | Werych |
| 4,339,902 | 7/1982 | Cimochowski et al. ......... 52/509 X |
| 4,379,382 | 4/1983 | Sauder et al. .................. 110/336 X |

Primary Examiner—Roy N. Envall, Jr.
Attorney, Agent, or Firm—Fitch, Even, Tabin & Flannery

[57] ABSTRACT

A thermal-insulating panel for use in an electric furnace. A refractory fiber mat is formed of discrete refractory fibers bonded together by an inorganic bonding agent having a hot face, a cold face and a plurality of side faces. A plurality of individual ceramic supports are partially embedded in said mat and protrude outward from the hot face. The embedded portions are shaped so as to be firmly anchored within the mat, and the protruding portions are shaped to support an electrical resistance heating ribbon in the interior of the furnace. The modules are preferably formed in a felting box where the ceramic supports extend horizontally from cavities in the front wall. The layers of fibers build up upon the bottom screen in planes perpendicular to the hot face of the module.

5 Claims, 6 Drawing Figures

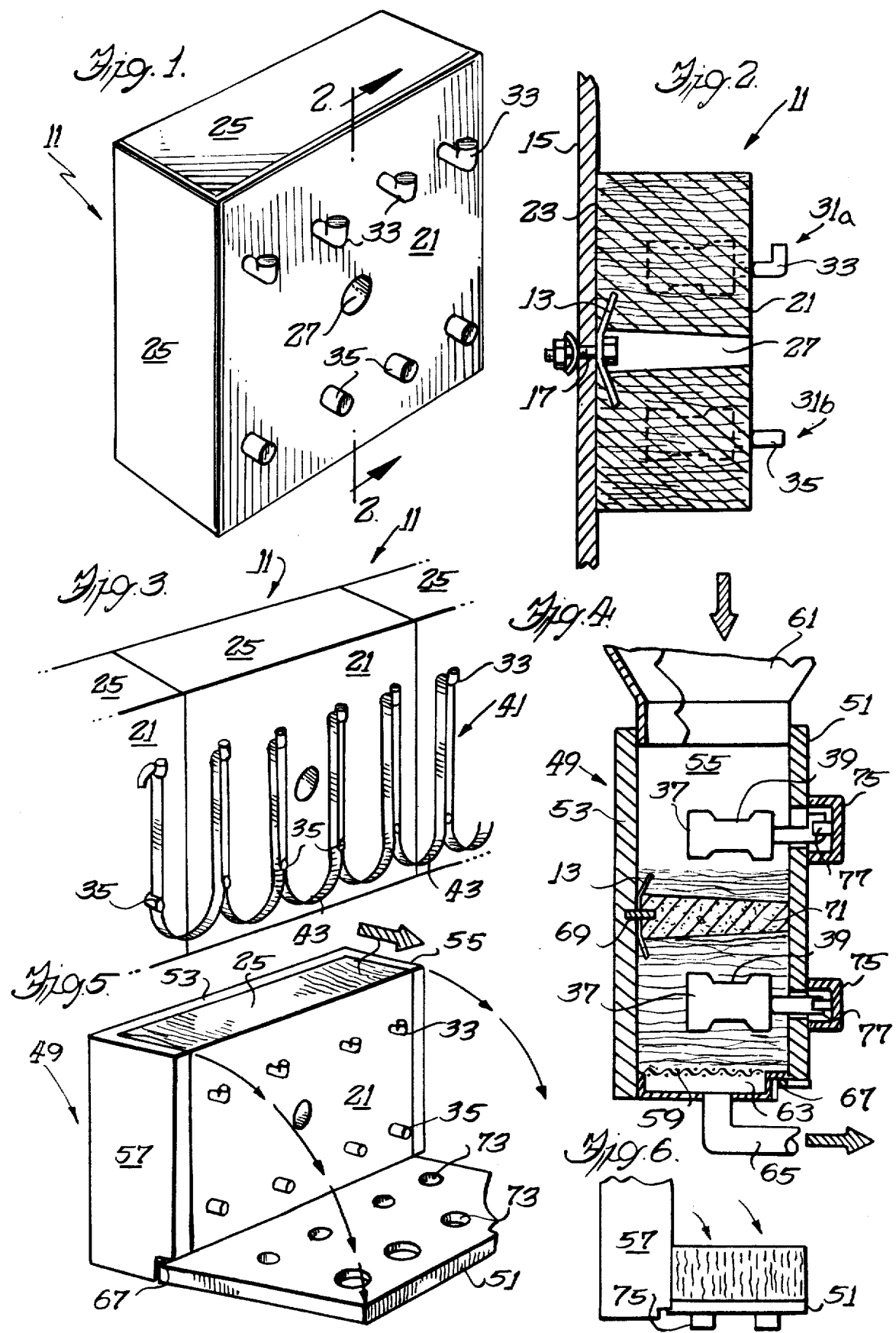

ELECTRIC FURNACE THERMAL-INSULATING MODULE

BACKGROUND OF THE INVENTION

The invention relates to improved thermal-insulating panels for high-temperature applications, and more particularly to ceramic fiber panels which not only provide thermal insulation for a high-temperature enclosure but which also support electrical resistance heating elements.

DESCRIPTION OF THE PRIOR ART

Firebrick has typically been used for the insulation of electrically heated furnaces; however, in recent years, it has become desirable and advantageous to utilize panels of ceramic fiber materials for high-temperature insulation purposes. Examples of such heat-insulating fibrous panels are shown in U.S. Pat. No. 4,122,644, issued Oct. 31, 1978 to Richard K. Woodruff, the disclosure of which is incorporated herein by reference. The panels disclosed in this patent include foraminous metal supporting clips embedded within a fibrous mat generally adjacent the cold face, which clips facilitate the attachment of such panels to an outer metal wall of a furnace enclosure or the like. Such panels, however, are not designed to support the electric resistance heating elements necessary for heating an electrical furnace or the like.

U.S. Pat. No. 4,249,888, issued Feb. 10, 1981, discloses ceramic fiber modules for employment in an industrial furnace, which modules are designed to incorporate a rectangular frame formed from four pieces of metal rod with threaded hangar rods welded in place at the four corners. A ceramic fibrous mat is felted about the support frame by locating it in a mold, suspended downward from the four hanging rods, and forming a mat about the structure by supplying a slurry of fibers plus a binder to the top of the mold. The threaded hanging rods extend out of the cold face of the module and pass through holes drilled in longitudinal members which support the sides and roof of the furnace. When the modules are used in an electric furnace, provision is made for embedding an electric resistance heating coil in the hot face of the module, which coil is connected to a source of power through anchoring ribbons embedded in the module and connecting pins that extend from the ribbons through the cold face of the panel.

The concept of embedding an electrical resistance heating coil in an insulating panel is considered to have the disadvantage of providing somewhat of an insulating barrier between all surfaces of the coil and the interior of the furnace which is to be heated and of also shortening the path of heat leak-out of the ceramic fiber module, by a distance equal to the depth of the recess. Accordingly, improvements in such insulating modules were sought.

SUMMARY OF THE INVENTION

Thermal-insulating panels designed for employment in electrically heated furnaces have been developed which incorporate integrally attached ceramic supports for the electrical resistance heating elements. More specifically, the improved modules include appropriately aligned ceramic supports having shank or body portions which are embedded in a refractory fiber mat and having protruding portions which extend from the hot face to support an electrical resistance ribbon suspended within the furnace chamber at locations generally adjacent the hot face of the module but out of contact with the fibrous felt.

In addition, the invention provides a method for making a module of this type where preferably the walls of the mold which form the hot face and cold face are vertical, and the hot face-forming sidewall contains cavities which accept what will eventually be the protruding portions of ceramic supports. The felting screen is normally at the bottom of the mold and defines one side of the ultimate module. After the felting process is complete and the fibrous mat has been formed, one of the vertical sidewalls defining either the hot face or the cold face of the mold is removed, as by swinging it away on a hinge connection, and the formed wet module is removed through the opening. Upon drying, usually in an air-circulating oven, the module becomes relatively rigid as a result of the setting of the inorganic binder, linking the refractory fibers to one another and completing the anchoring of the ceramic supports within the mat.

BRIEF DESCRIPTION OF THE DRAWINGS

FIG. 1 is a perspective view showing an insulation module embodying various features of the invention;

FIG. 2 is a side sectional view through the wall of an electric furnace showing the module of FIG. 1 mounted in an operative position;

FIG. 3 is a perspective view of a plurality of insulation modules arranged side-by-side in a horizontal row, as they might be disposed within an electric furnace enclosure, and having an electric resistance heating ribbon supported thereon;

FIG. 4 is a diagrammatic view showing a method for forming a module such as that shown in FIG. 1 using a felting process;

FIG. 5 is a perspective view depicting the opening of the mold shown in FIG. 4; and FIG. 6 is an elevational view, reduced in size, showing an alternative method for removing the module from a mold such as that depicted in FIG. 4.

DESCRIPTION OF THE PREFERRED EMBODIMENTS

Very generally, and as illustrated in FIG. 1, the invention provides a module 11 made primarily of a mat or felt of ceramic fiber material which may have one or more metal clips 13 integrally anchored in it to facilitate its mounting to an exterior wall 15 of a furnace enclosure. The clips 13 are formed of a foraminous material, for example, wire screening or expanded metal, and are preferably rectangular and bent to form a base plus a pair of wings which extend at similar angles from the base section, as disclosed in detail in U.S. Pat. No. 4,122,644. A central aperture in the base section of the clip 13 allows for the passage therethrough of a threaded stud or bolt 17 by which the mounting is effected.

The module 11 may generally have the shape of a rectangular parallelepiped, as illustrated, having a flat front face 21 which serves as the hot face of the insulation and a parallel rear or cold face 23. It also has four sides 25 which are perpendicular to the front and rear faces, with the top and bottom sides being parallel and with the two lateral sides being vertical, as generally employed in operative installation. As best seen in FIG.

2, the mounting clip 13 is disposed adjacent the cold face 23 of the module, and a frusto-conical hole 27 extends through to the hot face 21 to facilitate the installation of the module. The hole 27 is then filled with refractory fiber material, similar to that which makes up the mat, after installation is completed. Depending upon the size of the module, two or more supporting metal clips 13 can be employed.

Each of the modules 11 includes eight ceramic supports 31 which are used for installing the electric resistance heating elements in the furnace. Four upper supports 31a terminate in protruding ceramic hooks 33 whereas four lower supports 31b terminate in protruding knobs 35. The upper and lower ceramic supports have similar body or shank portions 37 which are formed with an intermediate section 39 of reduced dimension. The body portions 37 are completely embedded within the fibrous mat and as a result of the reduced dimension intermediate sections 39, they are physically captured and securely anchored in the rigid fiber mat and provide excellent rigidity with respect to the protruding hooks and knobs of the module. The supports 31 are made from a suitable ceramic material, such as porcelain, steatite or some other suitable mineral material, and in this respect, the term "ceramic" is intended to include appropriate mineral materials having good electrical insulating properties.

FIG. 3 shows several of the modules 11 mounted side-by-side as they would be along the vertical wall of an electrical furnace enclosure. The heat for such an electric furnace enclosure is provided by electrical resistance heating elements 41 which are usually in the form of elongated ribbons. The ribbons are arranged in a plurality of depending loops 43, each of which hangs between two of the protruding hooks 33 of the upper ceramic supports. The protruding knobs 35 of the lower supports serve as spacers between the lower portions of the loops 43 and prevent contact that might result in shorting of the resistance heating elements.

FIG. 4 of the drawings illustrates a felting box or mold 49 which might be employed to form the modules. Basically, the felting box 49 includes four vertical walls 51, 53, 55 and 57 and a felting screen 59 which constitutes the bottom of the box. A slurry of refractory fibers and water plus a colloidal inorganic binder is supplied to the felting box 49, usually through the open top via a feeder 61, and the water is withdrawn through the bottom screen 59 where it flows into a plenum 63 which connects to a line 65 that leads to a recirculation tank. Usually, either pressure or suction is employed to cause the water to drain downward at a satisfactory rate through the screen to deposit the fibers on the screen 59 and build up a layered mat of the desired thickness. Sufficient of the colloidal inorganic binder remains with the wet fibers to rigidly interconnect the fibers at their points of contact with one another after evaporation of the remainder of the water, which generally occurs during heating of the wet mat in a recirculating air oven and/or a firing of the refractory fiber mat.

The felting box 49 is constructed so that the two lateral walls 55,57 are stationary, and either the front wall 51 or the rear wall 53 is movable to permit the removal of the felted mat. As illustrated in FIGS. 4 through 6, the front wall 51, against which the hot face is formed, is preferably hinged to the bottom of the felting box so that it swings downward about a hinge pin 67. Alternatively, the rear wall 53 could be hinged, and the front wall 51 made stationary.

To locate the metal clip 13 at the desired location adjacent the cold face of the module, a peg 69 is provided which is proportioned to receive the central hole in the middle of the base portion of the metal clip. The peg 69 extends sufficiently from the rear wall 53 to also support a frusto-conical filler or pin 71 which is made of a consumable material and which extends for the full depth of the mold to the front sidewall 51. The pin 71 fills the open region 27 during the felting process so that refractory fibers are excluded from it, and during the subsequent heating, the pin 71 is consumed and leaves the void region 27 depicted in FIG. 2 and descibed above.

The front wall 51 includes eight cavities 73 which are proportioned to receive the protruding hooks 33 and knobs 35 of the eight ceramic supports. Preferably, the cavities are fitted with closures 75 to prevent excess draining of the slurry therefrom during the felting operation. To secure the ceramic supports 31 in the desired horizontal alignment during the felting operation, spring clips 77 are preferably provided in association with the cavities 73 so as to grasp the ends of the hooks and knobs and hold them in place while the mat of refractory fibers is built up from the bottom of the mold.

With the metal clip 13 and the filler cone 71 in place on the rear wall 53 and with the eight ceramic supports 31 positioned in the cavities 73 in the front wall 51, the felting operation is begun by supplying an aqueous slurry of refractory fibers and binder to the top of the felting box 49. Suction is applied to the bottom outlet line 65 causing the water to drain through the felting screen 59 and layers of wet fibers to build up across the bottom of the box which gradually increase in height. Alternatively, the mold 49 can be immersed in a tank containing the slurry, and suction can be similarly applied to the drain line for a sufficient time.

The refractory fibers which are usually employed are formed from inorganic oxides or the like, such as silica, zirconia, alumina, berylia, titania and mixtures thereof. One type of suitable fibers are alumina-silicate fibers, such as those avilable under the trademark "Fiberfrax", from the Carborundum Company, which have an approximate composition, by weight, of aluminum oxide 51.3%, silicon dioxide 47.2%, boron oxide 0.5% and sodium oxide 0.15%, with the remainder being trace inorganics. For very high temperature operations, a minor percentage of alumina fibers are usually included, such as those sold under the trademark "Saffil" which are about 95% alumina. Colloidal silica, which is commercially available as an aqueous dispersion of small spherical particles of silicon dioxide that are negatively charged, is the preferred inorganic binder. However, similar aqueous dispersions of other colloidal particles, such as colloidal alumina or colloidal zirconia, may also be employed. Coloidal silica is commercially available as an aqueous dispersion in amounts up to about 50% by weight of silica, and this feature, plus its relatively inexpensive price, makes it attractive for use in mass production operations.

When the mat has built up to the desired level within the felting box 49, supply of the slurry is halted, and the mold is opened by swinging the pivotable front wall 51 downward. Magnetic latches (not shown) or the like may be used to hold the hinged wall 51 in its closed position during the felting operation. The cavities 73 may be formed so as to easily release, and to clear, the protruding pins and knobs during the swinging movement, as depicted in FIG. 5. The wet fiber mat can then be removed from the felting box through the opening provided by the front wall, by sliding the conical filler 71 and the metal clip 13 off the peg 69 that extends from the rear wall. Alternatively, the spring clamps 77 associated with the cavities 73 can be made slightly stronger and the rear peg made slightly shorter, and the fibrous mat can be pivoted downward with the front wall, as depicted in FIG. 6, and then separated by lifting upward.

The felted mat will obtain its desired strength by drying at any temperature; however, preferably firing is carried out at an elevated temperature so as to simultaneously dry the felt to set the inorganic binder while the consumable filler pin 71 is removed by disintegration or the like. In this respect, the temperature is dependent upon the material from which the consumable filler is made. For example, a filler formed from core-molding sand should crumble after heating at a fairly low temperature to deteriorate its binder; while an oxidizable wood fiber material could be burned out in a circulating air oven at a temperature of 400° F. or above. Generally, an oven temperature of between about 400° F. and about 600° F. is used to dry the mat and remove the consumable filler in a reasonable time, such as an hour or less.

The resultant modules are ready for installation in a furnace enclosure of any type, such as a closed furnace chamber or an open tunnel or the like. The metal clip 13 adjacent the cold face 23 facilitates attachment to the structural member of the furnace, as by inserting a threaded bolt 17 through the central hole, via the access provided by the frusto-conical hole 27, and securing it in place by a nut and a lock washer. The upper and lower supports 31 are securely anchored in the now rigid fiber mat and provide secure points of support for the ribbon-like electric resistance heating element 41. When the aligned modules 11 have been installed, the electric resistance heating ribbon 41 is draped in the fashion shown in FIG. 3. The hooks 33 are long enough so as to accommodate the ribbon 41 in a location wherein it is lying adjacent to, but just out of contact with, the hot face 21 of the fibrous module.

The preferred felting process illustrated in FIG. 4 produces an additional advantage in the performance of the modules. It has been found that the disposition of the layers of refractory fibers in planes perpendicular to the hot face 21 of the module will provide superior insulation performance and lifetime, as opposed to modules formed in the conventional manner wherein the planes in which the fibers are laid down in the felting process lie parallel to the hot face. Previously, attempts have been made to utilize this property of the fibers by cutting a fibrous mat in strips and then rearranging the strips edgewise so as to orient the layer planes perpendicular to the hot face. The preferred felting method disclosed in FIG. 4 achieves this desired fiber orientation because, by employing the felting screen 59 to define one of the sides 25 of the modules, the planes of the fibers that are laid down will be perpendicular to the hot face 21. As a result, a module 11 made of a mixture 70 weight % Fiberfrax fibers and 30% Saffil fibers will withstand a temperature of upwards of about 2700° F. on its hot face 21 for an extended lifetime, and a module about 6 inches thick will have heat-transfer characteristics such that temperature at the cold face 23 of the module which is against the support member 15 will be about 165° F.

If temperatures in this very high range are not contemplated, the modules 11 may be formed in a more conventional felting box wherein either the hot face or the cold face of the module is defined by the felting screen. In either instance, cavities would be provided in the structures defining the hot face surface which would accept the protruding plugs and hooks of the ceramic supports.

Although the invention has been described in respect of several preferred embodiments, it should be understood that changes and modifications as would be obvious to one having the ordinary skill in the art may be made without departing from the scope of the invention which is defined solely by the appended claims. For example, if it is not desired to provide a consumable pin 71, access to the metal clip 13 from the front surface 21 of the module can be provided by drilling or the like. Whereas the arrangement of hooks 33 and knobs 35 is adequate to support electric resistance heating ribbons from the wall of a furnace, and although normally heating will not be provided at the roof of a furnace enclosure, if it should be desired to provide heating at the interior of the roof, similar modules could be provided having a second set of hooks in substitution for the knobs which could then support such ribbons in a horizontal orientation.

Various features of the invention are emphasized in the claims which follow.

What is claimed is:

1. A thermal-insulating panel for use in an electric furnace, which panel comprises
    a refractory fiber mat, formed of discrete refractory fibers being interconnected and bonded together by an inorganic bonding agent, having a hot face, a cold face and a plurality of side faces and
    a plurality of individual ceramic supports partially embedded in said mat and partially protruding outward from said hot face thereof, the embedded portions being shaped with an intermediate section of reduced dimension so as to be firmly anchored by said interconnected fibers of said fibrous mat which are rigidly interconnected to one another at their points of contact by said inorganic bonding agent to create a rigid fiber mat,
    said ceramic support protruding portions being shaped to support an electrical resistance heating ribbon in the interior of the furnace generally adjacent said hot face.

2. A panel in accordance with claim 1 wherein a foraminous metal supporting member is embedded within said fiber mat having holes through which said individual refractory fibers extend to firmly anchor said member therewithin.

3. A panel in accordance with claim 1 wherein said ceramic supports have body portions including a section of reduced dimension relative to the remainder which is necked down from both the upper and lower surfaces thereof.

4. A panel in accordance with claim 3 wherein said supports include protruding hook members and are generally horizontally aligned.

5. A panel in accordance with claim 4 wherein a protruding peg is located vertically spaced below each said hook member.

* * * * *